US011421887B1

(12) United States Patent
Jan et al.

(10) Patent No.: US 11,421,887 B1
(45) Date of Patent: *Aug. 23, 2022

(54) COMBUSTIBLE FUEL BURNING STOVE WITH SPARK ARRESTOR

(71) Applicant: Solo Brands, LLC, Grapevine, TX (US)

(72) Inventors: Jeffrey H. Jan, Keller, TX (US); Spencer H. Jan, Keller, TX (US); Alexander K. Maghsadi, Lewisville, TX (US); Eric H. Jan, Lehi, UT (US)

(73) Assignee: SOLO BRANDS, LLC, Grapevine, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,173

(22) Filed: Apr. 21, 2022

Related U.S. Application Data

(63) Continuation of application No. 16/514,773, filed on Jul. 17, 2019, now Pat. No. 11,378,279.

(51) Int. Cl.
*F24B 1/192* (2006.01)
*F24C 15/36* (2006.01)

(52) U.S. Cl.
CPC .............. *F24B 1/192* (2013.01); *F24C 15/36* (2013.01)

(58) Field of Classification Search
CPC ... F24C 15/36; F24B 1/192; F24B 3/00; A47J 37/0786; A47J 37/049; Y02A 40/928
See application file for complete search history.

(56) References Cited

U.S. PATENT DOCUMENTS

| 4,558,687 | A | 12/1985 | Minshall et al. |
| 5,117,558 | A | 6/1992 | Hull |
| 6,196,121 | B1 | 3/2001 | Crowl |
| 2004/0002032 | A1 | 1/2004 | O-No |
| 2006/0097529 | A1 | 5/2006 | White |
| 2006/0236996 | A1 | 10/2006 | Mosher et al. |
| 2011/0214662 | A1 | 9/2011 | Contarino, Jr. |
| 2012/0196232 | A1 | 8/2012 | Miller |
| 2015/0110939 | A1 | 4/2015 | Benson et al. |
| 2017/0143161 | A1 | 5/2017 | Masterson et al. |
| 2019/0145625 | A1 | 5/2019 | Satterley |

FOREIGN PATENT DOCUMENTS

KR          101786730 B1    10/2017

OTHER PUBLICATIONS

International Application Division, Korean Intellectual Property Office, International Search Report, PCT/US2020/039178, dated Oct. 13, 2020, 3 pages, Republic of Korea.

*Primary Examiner* — Alfred Basichas
(74) *Attorney, Agent, or Firm* — Haynes and Boone, LLP

(57) ABSTRACT

Disclosed is a stove having a top portion including a spark arrestor which includes a base assembly comprising a base ring, a base crown, a mesh side screen connecting the base ring and the base crown, and at least one handle, and a top assembly comprising a top crown, a mesh top screen extending from the top crown, and at least one handle, wherein the base assembly is sized to fit removably onto the top portion of the stove such that the base assembly is configured to block sparks or embers produced by the stove, and wherein the top assembly fits removably onto the base crown such that the top assembly is configured to block sparks or embers produced by the stove.

15 Claims, 17 Drawing Sheets

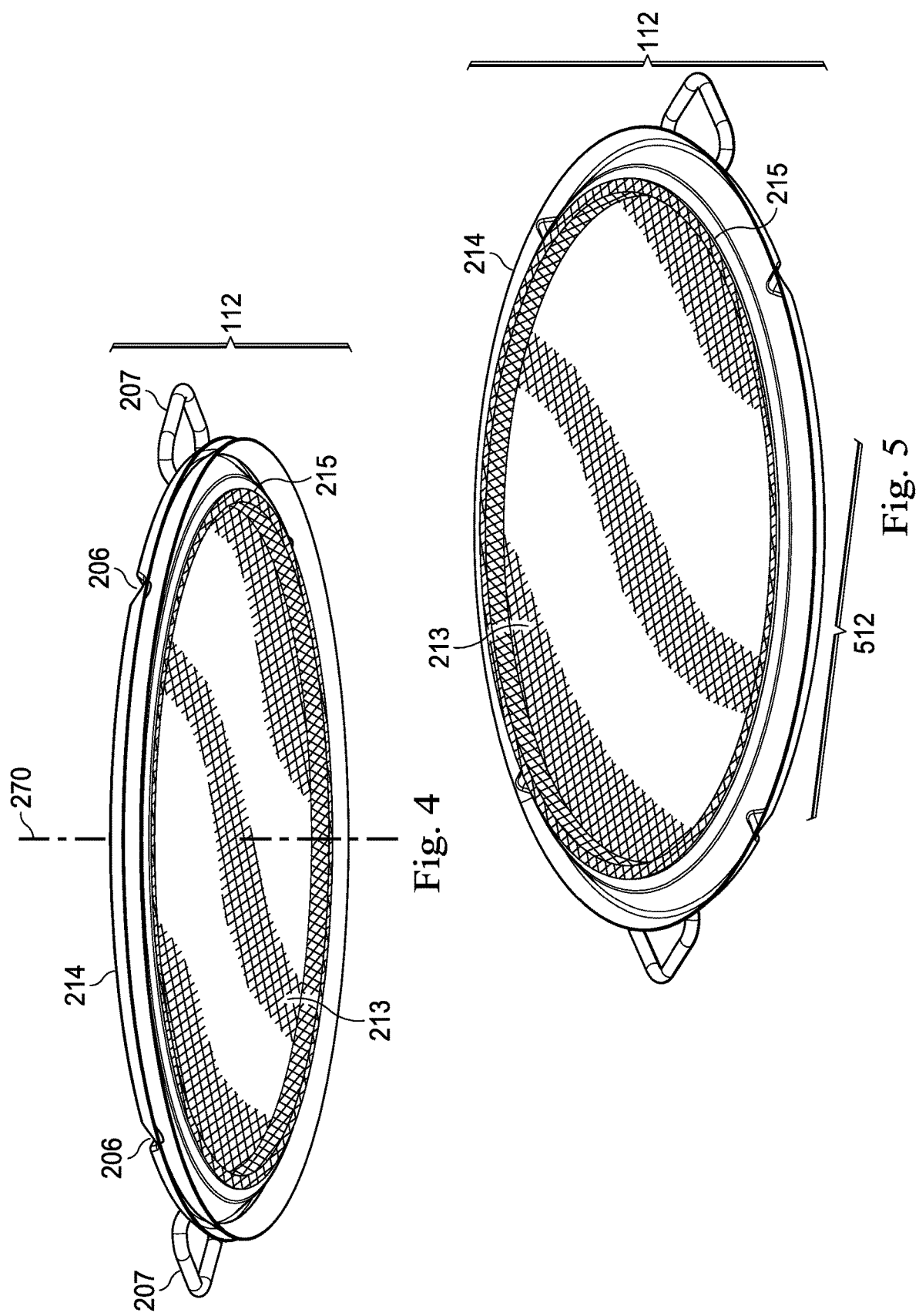

COMBUSTIBLE FUEL BURNING STOVE WITH SPARK ARRESTOR

CROSS REFERENCE TO RELATED APPLICATIONS

This application is a continuation U.S. patent application Ser. No. 16/514,773 filed Jul. 17, 2019, hereby incorporated by reference in its entirety as though fully set forth herein.

TECHNICAL FIELD

The subject matter described herein relates to a combustible fuel burning stove with a two-piece spark arrestor. This spark arrestor has particular but not exclusive utility for portable back yard firepits.

BACKGROUND

Portable wood burning stoves and firepits are used for example in camping, in residential back yards, or other locations to provide outdoor heat, ambiance, decoration, and to support cooking such as roasting of marshmallows and hot dogs, toasting bread, etc.

Stoves (including firepits, defined herein as a type of stove) may require a combination of large fuel (e.g., logs and sticks) and small kindling fuel (e.g., twigs, straw, paper, etc.), and may create significant upward and outward airflow that may entrain sparks and embers from the combusting fuel. For this reason, a spark arrestor may be employed to minimize the escape of sparks and embers from the stove or firepit. However, existing spark arrestors either completely cover the top of the stove or firepit with a screen or grating, limiting access to the combustion area (e.g., to add additional fuel), or else comprise hinged, multipart assemblies that add both complexity and weight, and are subject to warpage, corrosion, debris entrapment, and other problems. Existing spark arrestors also employ welded seams and other linear joins that detract from visual appearance and create failure points that limit the operating life of the spark arrestor.

When experiencing repeated cycles of cold (during disuse) and high heat (during use), spark arrestors for large firepits are subject to bowing or sagging that may be aesthetically displeasing, and may cause a poor fit with other components of the firepit, thus presenting a potential fire risk. Spark arrestors are also subject to oxidation, and to other deformation that may limit their service life and may, in some circumstances, cause structural failure with additional attendant fire risk. Conventional spark arrestors may also provide insufficient air flow, which in turn may lead to inadequate combustion of fuel, inadequate heat production, and excessive generation of smoke. Complex spark arrestors incorporating seams and hinges may be heavy (and therefore less portable), may require a high amount of material to construct, and may also require complex (and therefore more expensive) manufacturing steps.

It is therefore to be appreciated that such commonly used spark arrestors have numerous drawbacks, including one or more of high cost, large weight, low portability, poor combustion performance, short service life, smoke generation, fire risk, safety risk, and aesthetic degradation, among others. Accordingly, long-felt needs exist for spark arrestors that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a spark arrestor for a wood burning stove. In certain aspects, the disclosed apparatus includes a stove having a top portion, comprising: a spark arrestor comprising: a base assembly comprising a base ring, a base crown, a mesh side screen connecting the base ring and the base crown, and at least one handle; and a top assembly comprising a top crown, a mesh top screen extending from the top crown, and at least one handle; wherein the base assembly is sized to fit removably onto the top portion of the stove such that the base assembly is configured to block sparks or embers produced by the stove, and wherein the top assembly fits removably onto the base crown such that the top assembly is configured to block sparks or embers produced by the stove.

Embodiments may include: the stove, wherein the base ring, base crown, and top crown are circular. The stove, wherein the mesh side screen forms a truncated cone, pyramid, cylinder, or rectangular tube. The stove, wherein the mesh top screen is flat. The stove, wherein the flat mesh screen has a radius of curvature greater than a width or diameter of the base ring. The stove, further comprising at least one indented rest in at least one of the base crown or the top crown. The stove, wherein both the base crown and the top crown comprise indented rests, and wherein an indented rest of the top crown interacts with a rest of the base crown to arrest rotation of the top crown with respect to the base crown. The stove, wherein the at least one indented rest is sized to receive a roasting stick in the indented rest, with a proximal end in contact with a ground surface and a distal end suspended over the stove. The stove, wherein the at least one handle of the base assembly comprises two handles located about 180 degrees apart on the base assembly, and wherein the at least one handle of the top assembly comprises two handles located about 180 degrees apart on the top assembly. The stove, wherein the handles of the base assembly are shaped to be hooked by a pair of removal tools so as to lift the base assembly in a stable orientation. The stove, wherein the handles of the top assembly are configured such that a pair of removal tools may hook into the handles and lift the top assembly in a level orientation. The stove, wherein at least one of the stove, base ring, base crown, mesh side screen, the at least one handle of the base assembly, the top crown, the mesh top screen, and the at least one handle of the top assembly is made of stainless steel. The stove, wherein at least one of the mesh side screen and the mesh top screen comprises a mesh including between 60% and 90% open space.

In certain aspects, the disclosed apparatus includes a spark arrestor for a combustion stove, comprising: a frustrum-shaped base assembly comprising a base ring, base crown, mesh side screen, and at least one handle; and a top assembly comprising a top crown, mesh top screen, and at least one handle; wherein the base assembly fits removably onto a top portion of the stove such that the base assembly is configured to block sparks or embers produced by the stove, and wherein the top assembly fits removably onto the base crown such that the top assembly is configured to block sparks or embers produced by the stove.

Embodiments may include: the spark arrestor, wherein the base ring, base crown, and top crown are circular, the mesh side screen forms a truncated cone, and the top mesh forms a dome with a radius of curvature greater than a width or diameter of the base ring. The spark arrestor, further comprising at least one indented rest in the base crown and at least one rest in the top crown, wherein the at least one rest of the top crown interacts with the at least one rest of the base crown to arrest rotation of the top crown with respect to the base crown, and wherein the rests are configured such that a roasting stick may be rested in the rest, with a proximal end in contact with a ground surface and a distal end suspended over the stove. The spark arrestor, wherein the at least one handle of the base assembly comprises two handles located about 180 degrees apart on the base assembly, and wherein the at least one handle of the top assembly comprises two handles located about 180 degrees apart on the top assembly, configured such that a pair of removal tools may hook into the handles and lift either or both of the top assembly or the base assembly in a level orientation. The spark arrestor, wherein the base ring, base crown, mesh side screen, the at least one handle of the base assembly, the top crown, the mesh top screen, and the at least one handle of the top assembly comprise stainless steel, and wherein the mesh side screen and the mesh top screen comprise a mesh including between 60% and 90% open space.

In certain aspects, the disclosed apparatus includes a stove assembly comprising: a combustion stove comprising: a combustion cavity; a top rim; a rest situated on the top rim; a roasting stick comprising: a proximal assembly comprising: a handle; a proximal rod segment attached to a distal end of the handle; a threaded male end disposed at a distal end of the proximal rod segment; a distal assembly comprising: a distal rod segment; a threaded female receiver disposed at a proximal end of the distal rod segment; and a tip disposed at a distal end of the distal rod segment, the tip configured to hold or suspend a food item, the threaded female receiver being threadable onto the threaded male end to longitudinally join the proximal rod segment and distal rod segment, the longitudinally joined proximal rod segment and distal rod segment having a length sufficient to suspend the food item over the combustion cavity, and the threaded female receiver being unthreadable from the threaded male to reduce the length, and the length of the longitudinally joined proximal rod segment and distal rod segment sufficient to extend from the ground, into the rest, and over the combustion cavity, and the proximal rod segment and distal rod segment each having a length sufficient to fit completely within the combustion cavity when separate from one another.

Embodiments may include: the stove assembly, wherein the handle, proximal rod segment, threaded male end, distal rod segment, threaded female receiver, and tip comprise stainless steel.

In certain aspects, the disclosed apparatus includes a removal tool for a spark arrestor of a stove, comprising: a handle; a rod disposed at a distal end of the handle; a hook disposed at a distal end of the rod, the hook comprising: a raised curve; two lowered curves; and a raised tip.

Embodiments may include the removal tool, wherein the raised curve, the two lowered curves, and raised tip are sized and shaped for engaging with handles of the spark arrestor such that when two removal tools engage handles located 180 degrees apart on the spark arrestor, the spark arrestor, or subassemblies thereof, may be removed from or replaced onto the stove in a level orientation. The removal tool, wherein the removal tool is made of stainless steel.

In certain aspects, the disclosed apparatus includes a stove for burning solid fuel to produce heat, comprising: an inner wall having a lower portion and an upper portion; an outer wall having a lower portion and an upper portion; an air-filled space between the inner and outer wall; a chimney formed by the inner wall; a combustion area situated within the chimney; at least one ventilation hole within the upper portion of the inner wall; at least one ventilation hole within the lower portion of the outer wall; a spark arrestor situated above the combustion area, comprising: a frustrum-shaped base assembly comprising a base ring, base crown, mesh side screen, and at least one handle; and a top assembly comprising a top crown, mesh top screen, and at least one handle; wherein the base assembly fits removably onto a top portion of the stove such that the base assembly is configured to block sparks or embers produced by the stove, and wherein the top assembly fits removably onto the base crown such that the top assembly is configured to block sparks or embers produced by the stove.

Embodiments may include: the stove, wherein the spark arrestor is supported only at a perimeter of the spark arrestor. The stove, wherein the handles are sized and shaped to be lifted by a removal tool without a change in orientation relative to a ground surface. The stove, further comprising one or more rests sized and shaped such that a roasting stick may be rested in the rests with a proximal end contacting a ground surface and a distal end disposed above the stove. The stove, further comprising the roasting stick. The stove, further comprising the removal tool.

In certain aspects, the disclosed apparatus includes a spark arrestor assembly for a combustion stove, comprising: a first assembly comprising: a first ring defining a lower opening, a first crown defining an upper opening, and a mesh side screen extending between the first ring and the first crown; and a second assembly removably disposable on the first assembly and sized and shaped to cover the upper opening defined by the first crown of the first assembly, the second assembly comprising: a second ring forming a perimeter defining an area of the top assembly, a mesh top screen in the area defined by the perimeter, and wherein at least one of the first assembly and the second assembly comprises a handle.

Embodiments may include: the spark arrestor assembly, wherein the first assembly comprises at least one handle and the second assembly comprises at least one handle. The spark arrestor assembly, wherein the mesh top screen spans the area defined by the perimeter of the second ring. The spark arrestor assembly, wherein the second ring has substantially the same diameter as the first crown. The spark arrestor assembly, wherein the lower opening has an area greater than an area of the upper opening, the lower assembly having a frustum-shape. The spark arrestor assembly, further comprising a removal tool shaped to interface with the handle of the first at least two spaced locations to provide stability. The spark arrestor assembly, wherein the removal tool comprises: a rod having a distal end and proximal end; and a hook disposed at the distal end of the rod, the hook comprising: a raised curve; two lowered curves; and a raised tip. The spark arrestor assembly, wherein the first ring, first crown, and second ring are circular.

The spark arrestor disclosed herein has utility, but not exclusive, for stoves, including firepits.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the spark arrestor, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 4 is a bottom perspective view of the top assembly of a spark arrestor for a wood burning stove in accordance with at least one embodiment of the present disclosure.

FIG. 5 is a perspective view of the top assembly of an example spark arrestor for a wood burning stove in accordance with at least one embodiment of the present disclosure, showing an example fold-and-stamp friction fitting that secures the top screen to the top crown with the top retention ring.

DETAILED DESCRIPTION

Figure 1:
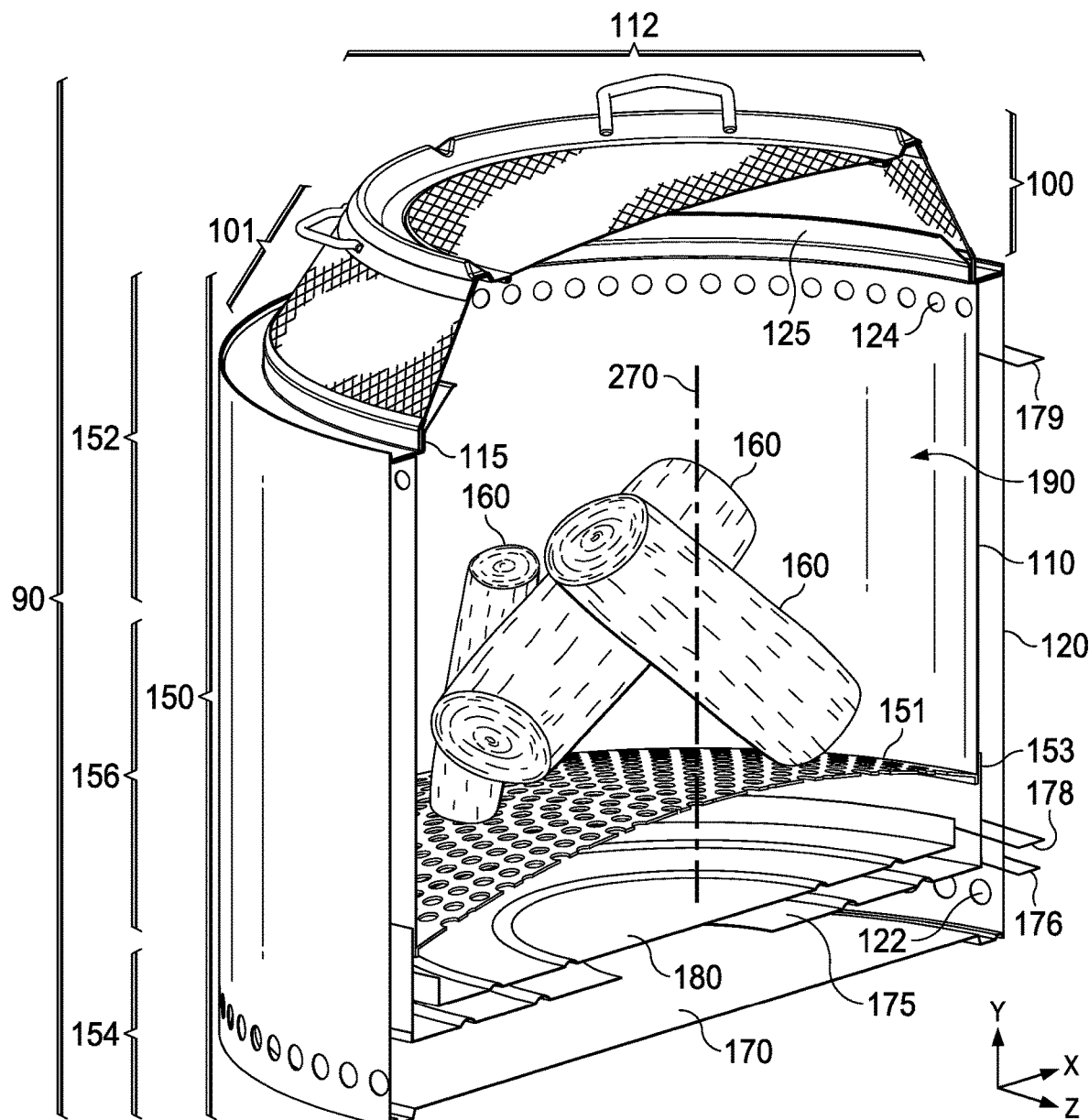
FIG. 1 is a cross-sectional view of an example combustion stove, such as a wood burning stove including a spark arrestor in accordance with at least one embodiment of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

In accordance with at least one embodiment of the present disclosure, a spark arrestor for a wood burning stove is provided which includes novel structural features to minimize the number and speed of sparks escaping from the stove during combustion of fuel, and to prevent significant warping, bowing, sagging, or other deformation under the heat loads expected during normal use cases and plausible exceptional use cases. The disclosed spark arrestor also includes air flow features conducive to thorough combustion of fuel, which may lead to greater heat generation by the stove and substantially reduced smoke, as compared with existing spark arrestors. The design may be readily manufactured (e.g., from a combination of sheet metal blanks and mesh blanks that are stamped, formed, and folded into the configurations described herein, or other configurations that have the same effect), which permits it to be lighter, less expensive, more durable, and more aesthetically pleasing than hinged assemblies of comparable spark-blocking capability, while also being more versatile than one-piece spark arrestor assemblies.

These descriptions are provided for exemplary purposes only, and should not be considered to limit the scope of the spark arrestor. Certain features may be added, removed, or modified without departing from the spirit of the claimed subject matter.

FIG. 1 is a cross-sectional view of an example combustion stove 90, including a wood burning stove 150 and a spark arrestor 100 in accordance with at least one embodiment of the present disclosure. In some embodiments, the spark arrestor 100 is a two-part assembly, forming a circular, right conic frustrum with a slightly domed top. The spark arrestor 100 includes a spark arrestor base assembly 101 and a spark arrestor top assembly 112. During normal operation, the top assembly 112 rests removably on the base assembly 101, which rests removably on a connecting ring 125, which rests removably on the top portion 152 of the stove or firepit 150.

The spark arrestor 112 rests on top of the connecting ring 125 of the stove or firepit 150. The connecting ring 125 is sized and shaped to interface with the ring-shaped upper surface of the top portion 152 of the stove or firepit 150, and with the truncated cone shape of the spark arrestor base assembly 101.

A fire grate 151 sits within the stove or fire pit 150 and supports the weight of fuel 160 (e.g., wooden logs and sticks) while permitting air flow through the fire grate 151 and stove or fire pit 150 to facilitate combustion of the fuel 160. The fire grate 151 is strong and stiff to maintain its shape, both at ambient temperatures and at operating temperatures, and may resist substantial warping or other substantial deformation despite prolonged and repeated exposure to the heat of combustion.

In the example embodiment of FIG. 1, the combustion stove 150 includes a top portion 152, a bottom portion 154, and a middle portion 156. The firepit 150 further includes an inner wall or inner body 110, an outer wall or outer body 120, a connecting ring 125 located in the top portion 152 of the stove 150 and attached to or formed as a single piece with the inner body 110 and the outer body 120, and a chimney or combustion cavity 190 defined by the inner body 110, within which the fire grate 151 is positioned. The stove 150 further includes a top lip 115 attached to or formed as a single piece with either of the inner body 110 and outer body 120. The stove 150 further includes a plurality of outer ventilation holes 122 located in the bottom portion 154 of the outer body 120, and a plurality of inner ventilation holes 124 located in the top portion 152 of the inner body 110. In the middle portion 156 of the stove 150, the inner body 110 terminates in an upward-facing support lip or rollover 153 into which the fire grate 151 fits, or upon which the fire grate 151 rests.

The stove 150 further includes a base plate 170 attached to the outer body 120, a bracing tray 175 supported by stands projecting upward from the base plate, and a catch tray 180 supported by stands projecting upward from the bracing tray 175 such that the bracing tray is separated from the outer body by an air gap 176, the catch tray 180 is separated from the outer body 120 by an air gap 178, and the inner body is separated from the outer body by an air gap 179. In an example, air gaps 176 and 179 are both about 50 mm, while air gap 178 is about 100 mm, although other air gaps may be employed that have the disclosed, advantageous effect.

The chimney or combustion cavity 190 is in fluid communication with the air gap 179 via the inner ventilation holes 124, and with air gaps 178 and 176 via the fire grate 151. The air gaps 176 and 178 are in fluid communication with ambient air via the outer ventilation holes 122, such that ambient air may be drawn in through the outer ventilation holes 122, heated by combustion of the fuel 160, and expelled through the chimney or combustion cavity 190 and inner ventilation holes 124 to produce advantageous combustion of the fuel 160.

In an example, the solid components of the spark arrestor 100, the fire grate 151, and the stove or firepit 150 are made of stainless steel plates having a thickness within a range of between about 0.5 mm and about 2.5 mm thick. Some examples of the fire grate 151 and the stove or firepit 150 are formed of 1.0 mm to 2.0 mm thick, and one example is about 1.5 mm thick stainless steel. Both thicker and thinner materials are contemplated.

In an example, the spark arrestor 100, or portions thereof, may be heated to temperatures of between about about 700° F. (371° C.) and about 1350° F. (732° C.) by the combustion of the fuel 160, for a time period of between 1 and 12 hours per use. During periods of disuse, the spark arrestor 100 may also experience ambient temperatures as low as −40° F. (−40° C.). In an example, during normal operation over a period of years, with repeated cycling (e.g., one hundred cycles) between ambient and operational temperatures, the spark arrestor 100 may exhibit little or no bowing, warping, or heat-related oxidation that would detrimentally affect its aesthetic appearance, its performance, or its mechanical fit within the top lip 115 of the stove or firepit 150.

Axis 270 shows a vertical reference line through the center of the stove or firepit 150.

The design of the two-piece spark arrestor 100 permits the top section 152 of the stove or firepit 150 to be covered by both the spark arrestor base assembly 101 and the spark arrestor top assembly 112, thus limiting the escape of sparks in all directions. In this configuration, the top screen 213 of the top assembly 101 may also be used as a lightweight cooking grill, e.g., for toasting bread, grilling burgers, heating lightweight pans or cans, or other heating of lightweight foods. However, the two-piece spark arrestor 100 also permits the top assembly 112 to be lifted off from the base assembly 101 and set aside, such that the top section 152 of the stove 150 is protected against lateral or horizontal escape of sparks or embers by the truncated conical mesh 203 of the base assembly 101, whereas sparks or embers are permitted to escape vertically, if this is perceived by a user to be acceptable or desirable. This top-removed configuration may for example permit a user to have access to the combustion cavity 190, e.g., to add or rearrange fuel 160, or may improve or alter the airflow or combustion efficiency, improve or alter cooking characteristics, or alter the aesthetic appearance of the stove or firepit 150. Such benefits are absent from one-piece spark arrestors which can only be lifted off as a single unit. A subset of the aforementioned benefits may occur with some hinged spark arrestors, but these advantages, if present, require a spark arrestor with greater complexity, weight, and cost, and with more failure modes and hence a shorter service life.

The present disclosure also provides for a seamless design that does not require the welding, brazing, or soldering of seams, or the placement of metal flashing over the seams or incorporation of metal flashing into the seams, and may thus provide for an aesthetically cleaner design that may be produced at lower cost, and may also thus provide for greater airflow for advantageous combustion. In an example, the mesh components of the spark arrestor 100 are made of stainless steel to limit corrosion, limit heat conduction, and improve aesthetic appearance, although other materials could be used.

Figure 2:
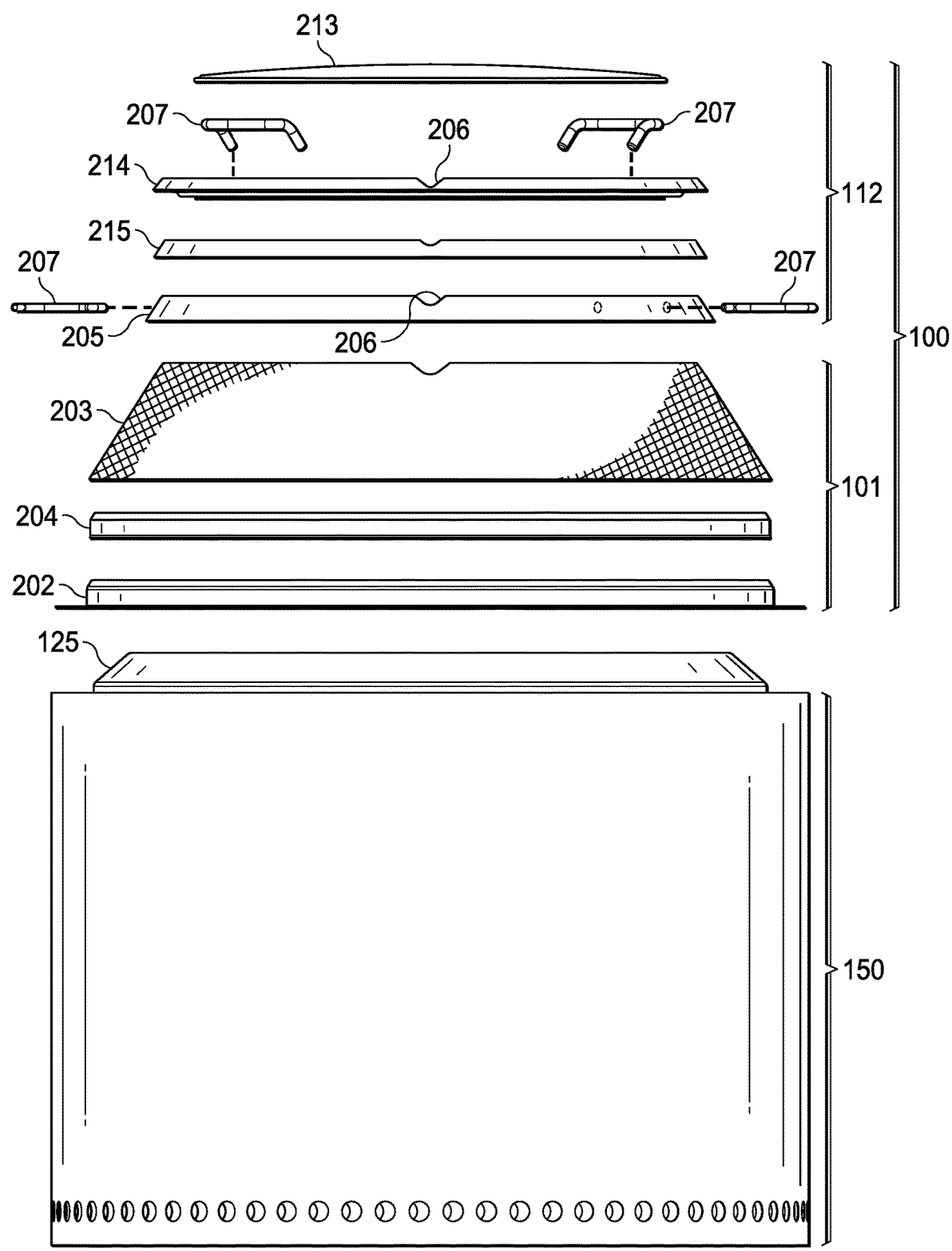
FIG. 2 is an exemplary exploded-view representation of a wood burning stove with spark arrestor in accordance with at least one embodiment of the present disclosure.

FIG. 2 is an exemplary exploded-view representation of a wood burning stove 150 with spark arrestor 100 in accordance with at least one embodiment of the present disclosure. The spark arrestor base assembly 101 includes a base ring 202, a truncated conical mesh screen 203, and a base retention ring 204 that holds the truncated conical screen 203 to the base ring 202. In some embodiments, the base retention ring 204 holds the truncated conical screen 203 to the base ring 202 with a crimped compression fitting. The base assembly 101 also includes a base crown 205 that includes rests 206 and handles 207. In an example, the base crown 205 includes four rests 206 and two handles 207. In some embodiments, the base crown 205 is attached to the truncated conical mesh screen 203 with a compression fitting. In some embodiments, the compression fitting is supplemented by welds (e.g., two, three, or four welds)

spaced around the base crown 205 to arrest motion of the base crown 205 with respect to the truncated conical mesh screen 203.

The spark arrestor top assembly 112 includes a mesh top 213. In some embodiments, the mesh top is 213 slightly domed to add stiffness and minimize warpage. A non-domed (i.e., flat) mesh top 213 may also be used but may not be as effective. In an example, the mesh top is domed such that its center is between 0.635 cm and 5.08 cm higher than its outer edge or, alternatively, with a radius of curvature that is greater than the outer diameter of the stove 150 or the base ring 202. For purposes of this document, a mesh top with a radius of curvature greater than the outer diameter of the stove 150 or the base ring 202 shall be described as a flat mesh top, in order to distinguish it from spark arrestor structures in the related art which may be substantially domed, with radii of curvature smaller than an outer diameter of the stoves on which they rest.

The top assembly 112 also comprises a top crown 214 that includes rests 206 and handles 207. In an example, the top crown 214 includes four rests 206 and two handles 207. The rests may be recesses, notches, indentations, or other related structures within the top crown 214 and base crown 205. In some embodiments, the rests 206 of the top crown 214 fit within or interact with the rests 206 of the base crown 205 to arrest rotation of the spark arrestor top assembly 112, and thus help hold the screen arrestor top assembly 112 in place on the screen arrestor base assembly 101. The top assembly 112 also includes a top retention ring 215 that holds the mesh top 213 to the top crown 214 with a fold-and-stamp compression fitting.

In an example, the mesh top 113 and truncated conical mesh screen 203 are made of 304 SS woven steel mesh with a wire diameter of 0.7 mm and approximately 74% open area. In an example, the base ring 202, base retention ring 204, base crown 205, top crown 214, and top retention ring 215 are made of 0.762 mm thickness 304 stainless steel.

In some embodiments, the stove 150, connector ring 125, and base ring 202 are sized and shaped such that the base assembly 101 "homes" into place within the top lip 115 when placed on the stove 150. Similarly, in some embodiments the base crown 205 and top crown are 214 are sized and shaped such that the top assembly homes into place on the base assembly when placed thereon.

Figure 3:
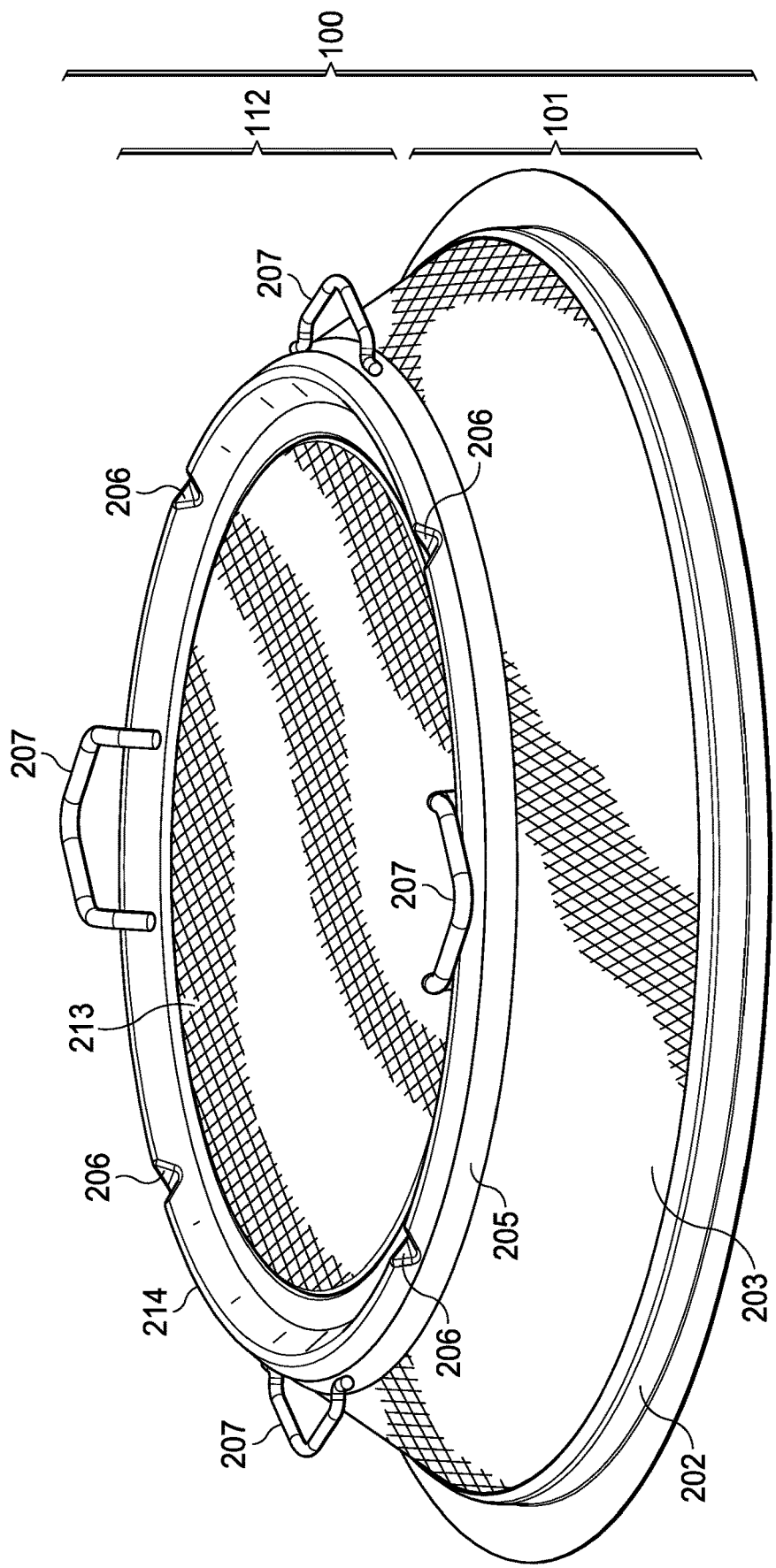
FIG. 3 is a top perspective view of an example spark arrestor for a wood burning stove in accordance with at least one embodiment of the present disclosure.

FIG. 3 is a top perspective view of an example spark arrestor 100 for a wood burning stove 150 in accordance with at least one embodiment of the present disclosure. In this example, the top assembly 112 is resting on the base assembly 101. Visible are the base ring 202, truncated conical mesh screen 203, base crown 205, and handles 207 of the base assembly 101. Also visible are the mesh top 213, top crown 214, rests 206 and handles 207 of the top assembly 112. In this example, the spark arrestor 100 is substantially wider than it is tall. This low-profile design may add stability by making the spark arrestor 100 more difficult to accidentally dislodge from the stove 150. In an example, all components are made of non-powder-coated stainless steel, and are designed to be docking or self-locating in the operational configuration, and to be nesting in a storage configuration (see below, FIGS. 8-11).

In some embodiments, the handles 207 of the base assembly 101 are located 180 degrees apart, to facilitate lifting with a pair of removal tools (see below, FIGS. 15-17) in a stable (horizontal or approximately horizontal) orientation. Similarly, the handles 207 of the top assembly 112 may be located 180 degrees apart, and the rests 206 of the top assembly 112 and base assembly 101 may interact such that the top assembly 112 may be placed on the base assembly 101 with its handles 90 degrees away from the handles of the base assembly 101, as shown in FIG. 3.

FIG. 4 is a bottom perspective view of the top assembly 112 of a spark arrestor 100 for a wood burning stove 150 in accordance with at least one embodiment of the present disclosure. Visible are the mesh top 213, top crown 214, rests 206 and handles 207 of the top assembly 112, along with reference axis 270.

FIG. 5 is a perspective view of the top assembly 112 of an example spark arrestor 100 for a wood burning stove 150 in accordance with at least one embodiment of the present disclosure, showing an example fold-and-stamp friction fitting that secures the top screen 213 to the top crown 214 with the top retention ring 215. In this example, the top screen 213 has been folded under the top retention ring 215, and the top retention ring 215 and top screen 213 have been stamped into place within the top crown 214. Other types of fittings or attachment methods may also be used. However, the fold-and-stamp friction fitting shown in FIG. 5 may lend itself to a faster, less complex, and less expensive manufacturing process.

Figure 6:
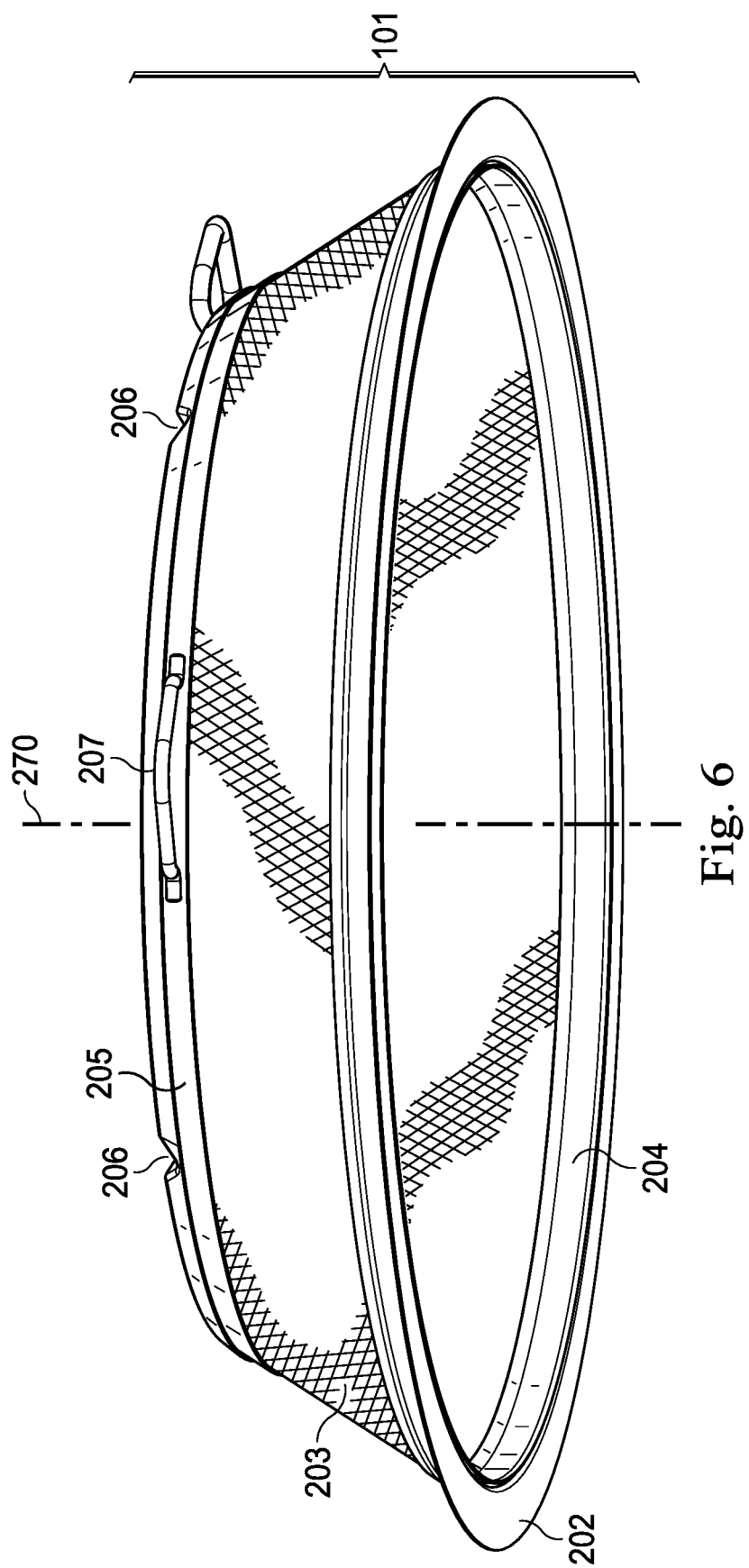
FIG. 6 is a bottom perspective view of the base assembly of an example spark arrestor for a wood burning stove in accordance with at least one embodiment of the present disclosure.

FIG. 6 is a bottom perspective view of the base assembly 101 of an example spark arrestor 100 for a wood burning stove 150 in accordance with at least one embodiment of the present disclosure. Visible are the base ring 202, truncated conical mesh screen 203, base retention ring 204, base crown 205, rests 206, and handles 207 of the base assembly 101, along with reference axis 270. In this example, the base retention ring 204 holds the truncated conical mesh screen 203 against the inner surface of the base ring 202 with a friction fitting, although other method of attachment may be used. In this example, the attachment between the truncated conical mesh screen 203 and the base crown 205 is also a friction fitting, although other methods of attachment may be used.

Figure 7:
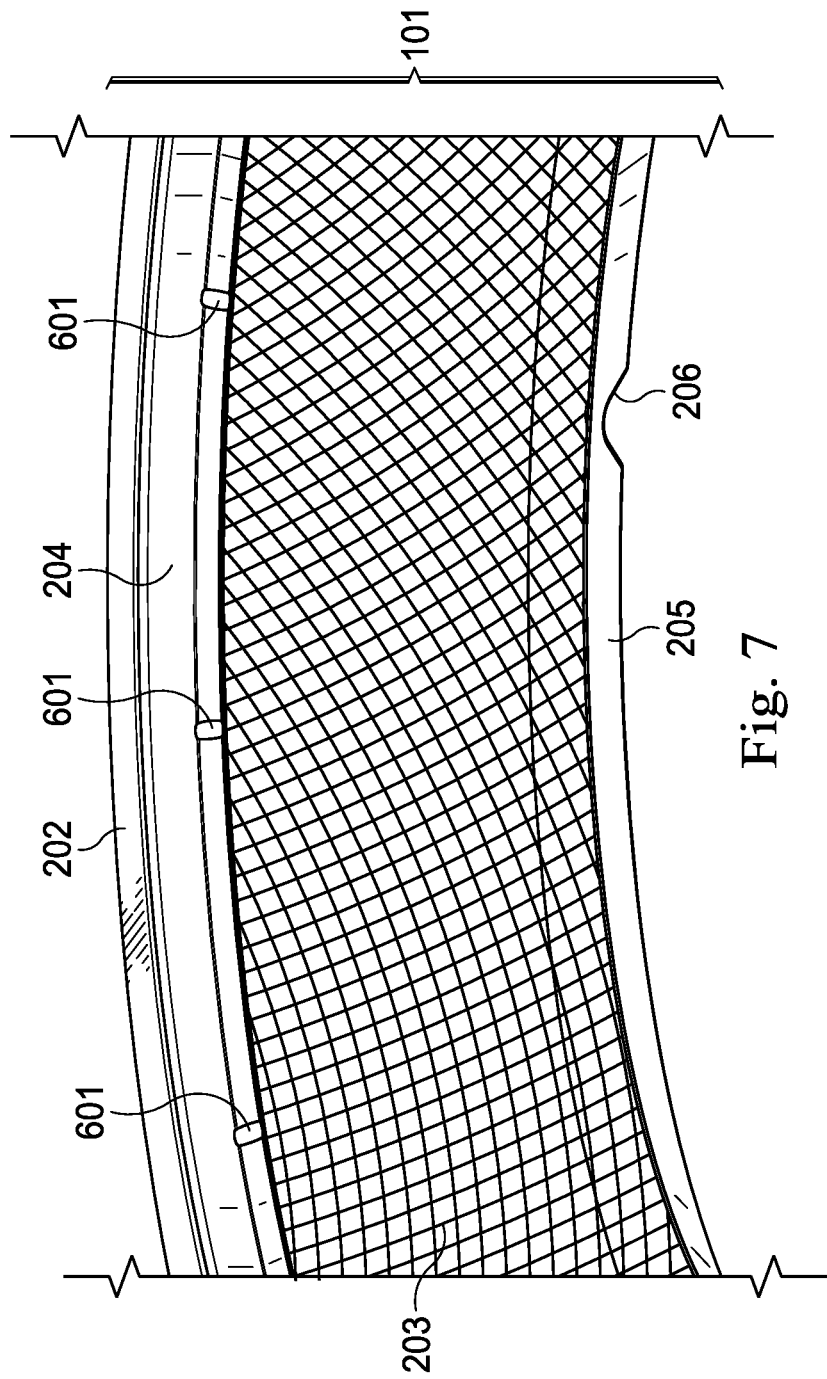
FIG. 7 is a view of an example crimp connection of an example spark arrestor base assembly for a wood burning stove in accordance with at least one embodiment of the present disclosure.

FIG. 7 is a view of an example crimp connection 601 of an example spark arrestor base assembly 101 for a wood burning stove 150 in accordance with at least one embodiment of the present disclosure. Visible are the base ring 202, truncated conical mesh screen 203, base retention ring 204, base crown 205, and a rest 206 of the base assembly 101. In this example, the mesh screen 203 has been fitted to the base ring 202 via the base retention ring 204 with a friction fit, supplemented by a series of crimps 601 to further arrest motion of the components. Other types of fittings or attachments may be used. However, the crimped friction fitting shown in FIG. 7 may lend itself to a faster, less complex, and less expensive manufacturing process.

Figure 8:
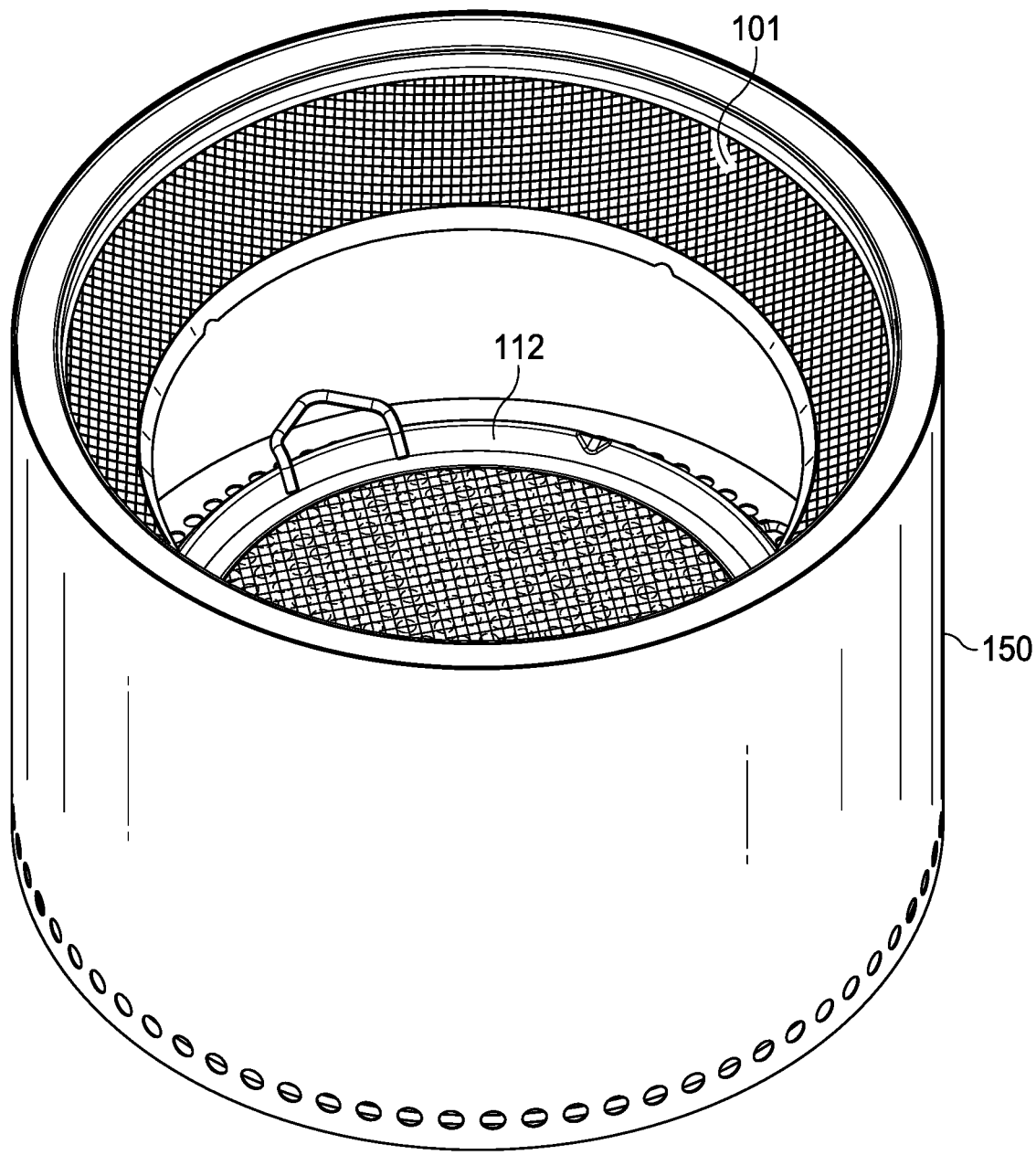
FIG. 8 is a perspective view of an example spark arrestor stowed within an example wood burning stove in accordance with at least one embodiment of the present disclosure.

FIG. 8 is a perspective view of an example spark arrestor 100 stowed within an example wood burning stove 150 in accordance with at least one embodiment of the present disclosure. In this example, the spark arrestor top assembly 112 has been placed right-side up in the bottom portion 154 of the interior of the stove or firepit 150 (i.e., on top of the fire grate 151), and the spark arrestor base assembly 101 has been placed upside down in the top portion 152 of the interior of the stove or firepit 150. The connecting ring 125 is not present in this view.

Figure 9:
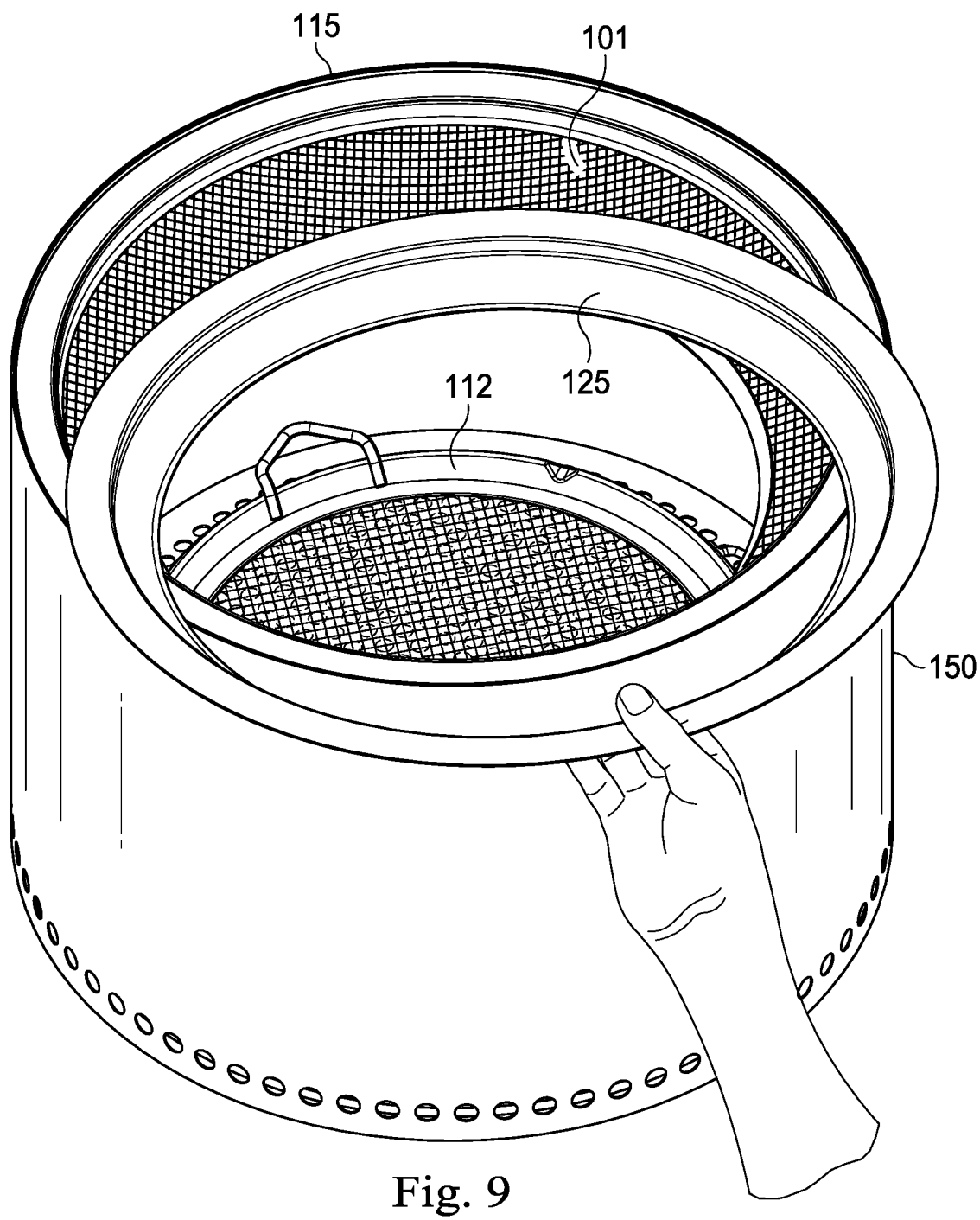
FIG. 9 is a perspective view of an example spark arrestor stowed within an example wood burning stove in accordance with at least one embodiment of the present disclosure.

FIG. 9 is a perspective view of an example spark arrestor 100 stowed within an example wood burning stove 150 in accordance with at least one embodiment of the present disclosure. As in FIG. 8, the spark arrestor top assembly 112 has been placed right-side up in the bottom portion 154 of the interior of the stove or firepit 150 (i.e., on top of the fire grate 151), and the spark arrestor base assembly 101 has been placed upside down in the top portion 152 of the interior of the stove or firepit 150, and is held in place by the top lip 115 of the stove 150. The connecting ring 125 is being moved into place in an upside-down orientation. The connecting ring 125 has been placed on top of the base assembly 101 in an upside-down orientation.

Figure 10:
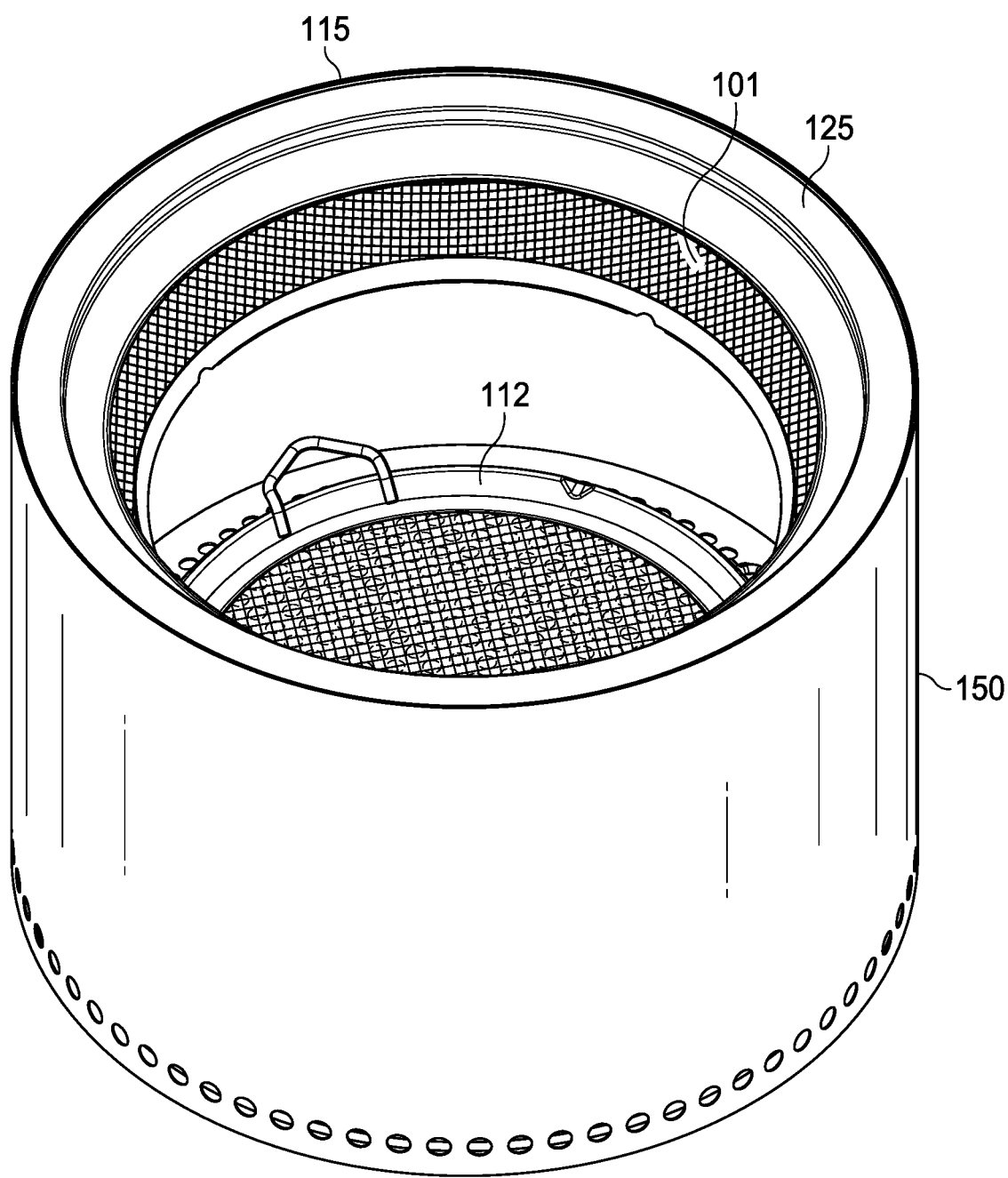
FIG. 10 is a perspective view of an example spark arrestor stowed within an example wood burning stove in accordance with at least one embodiment of the present disclosure.

FIG. 10 is a perspective view of an example spark arrestor 100 stowed within an example wood burning stove 150 in accordance with at least one embodiment of the present disclosure. As in FIGS. 8 and 9, the spark arrestor top assembly 112 has been placed right-side up in the bottom portion 154 of the interior of the stove or firepit 150 (i.e., on top of the fire grate 151), and the spark arrestor base assembly 101 has been placed upside down in the top portion 152 of the interior of the stove or firepit 150, and the connecting ring 125 has been placed upside down on top of the base assembly 101. Both the base assembly 101 and the connecting ring 125 are held in place by the top lip 115 of the stove or firepit 150.

Figure 11:
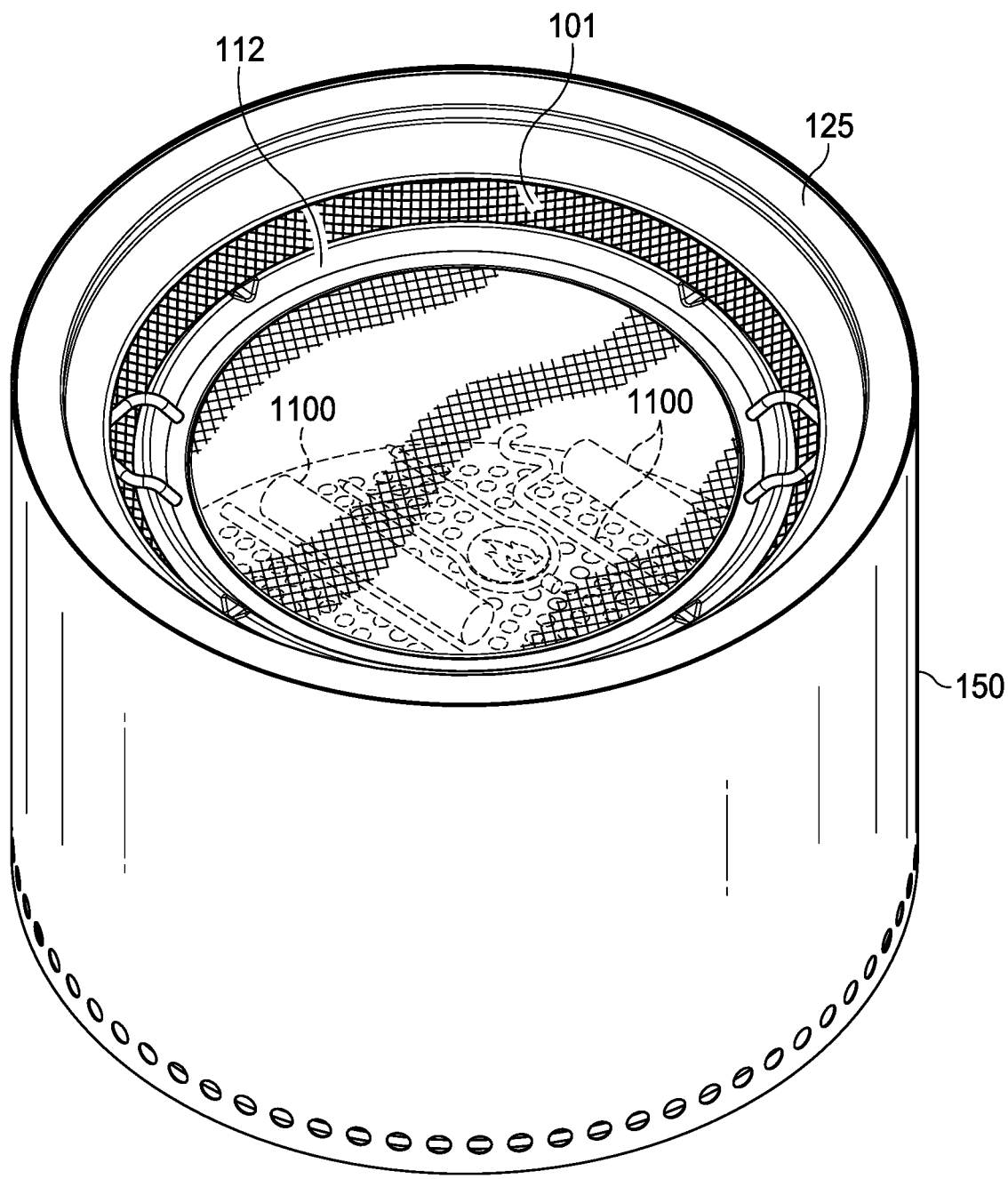
FIG. 11 is a perspective view of an alternative storage configuration for the wood burning stove with spark arrestor in accordance with at least one embodiment of the present disclosure.

FIG. 11 is a perspective view of an alternative storage configuration for the wood burning stove 150 with spark arrestor 100 in accordance with at least one embodiment of the present disclosure. In this example, the spark arrestor base assembly 101 has been placed upside down in the top portion 152 of the interior of the stove or firepit 150. The connecting ring 125 has been placed on top of the base assembly 101 in an upside-down orientation, and the spark arrestor top assembly 112 has been placed right-side up within the base assembly 101. This configuration may also allow for partially covered storage of fire-making implements and cooking implements 1100 in the bottom portion 154 of the stove or fire pit 150 (i.e., on top of the fire grate 151). Both the base assembly 101 and the connecting ring 125 are held in place by the top lip 115 of the stove or firepit 150.

Figure 12:
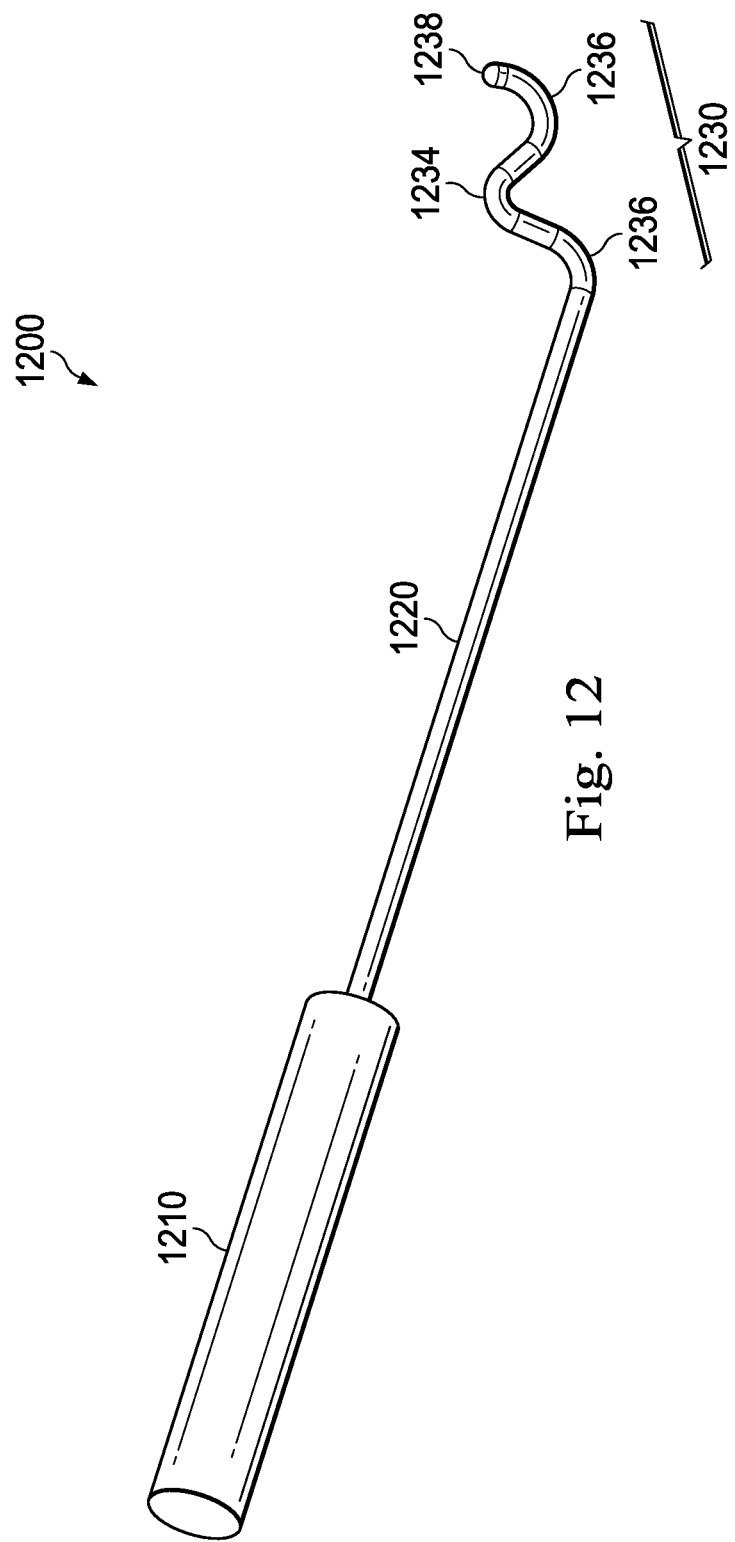
FIG. 12 is a perspective view of an example removal tool for a spark arrestor in accordance with at least one embodiment of the present disclosure.

FIG. 12 is a perspective view of an example removal tool 1200 for a spark arrestor 100 in accordance with at least one embodiment of the present disclosure. The removal tool 1200 includes a handle 1210, a rod 1220, and a hook 1230. In this example, the hook 1230 is sized and shaped to engage with the handles 207 of both the spark arrestor top assembly 112 and base assembly 101. The hook 1230 includes a raised curve 1234, two lowered curves 1236, and a raised tip 1238 that are sized and shaped for engaging with the handles 207, as shown below in FIGS. 13 and 14. In an example, the removal tool 1200 is made of stainless steel to limit both corrosion and heat conduction. The handle 1210 may be of solid construction (e.g., a stainless steel bar), although a hollow handle 1210 may be lighter.

Figure 13:
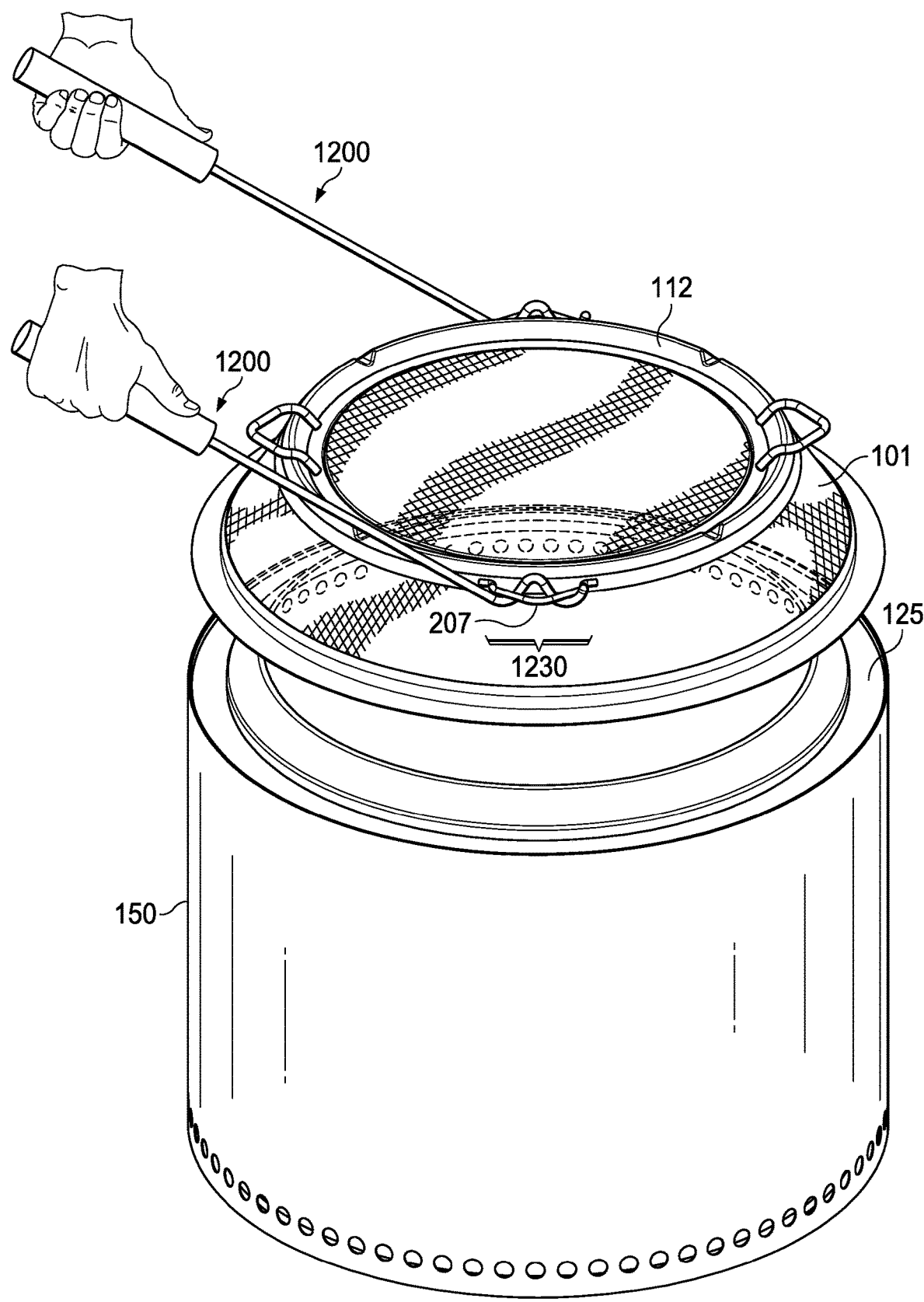
FIG. 13 is a perspective view of an example spark arrestor base assembly being lifted with a pair of example removal tools in accordance with at least one embodiment of the present disclosure.

FIG. 13 is a perspective view of an example spark arrestor base assembly 101 being lifted with a pair of example removal tools 1200 in accordance with at least one embodiment of the present disclosure. The hooks 1230 of the removal tools 1200 engage with the handles 207 of the base assembly 101, in such a way that the base assembly may be moved in a stable, level or approximately level orientation, without tipping, falling, or dangling, since these conditions could present a fire or safety risk if the base assembly 101 and/or top assembly 112 are hot. The base assembly 101 may be removed from or replaced onto the connecting ring 125 of the stove 150 with the removal tools 1200, either with or without the top assembly 112 resting on the base assembly 101.

Figure 14:
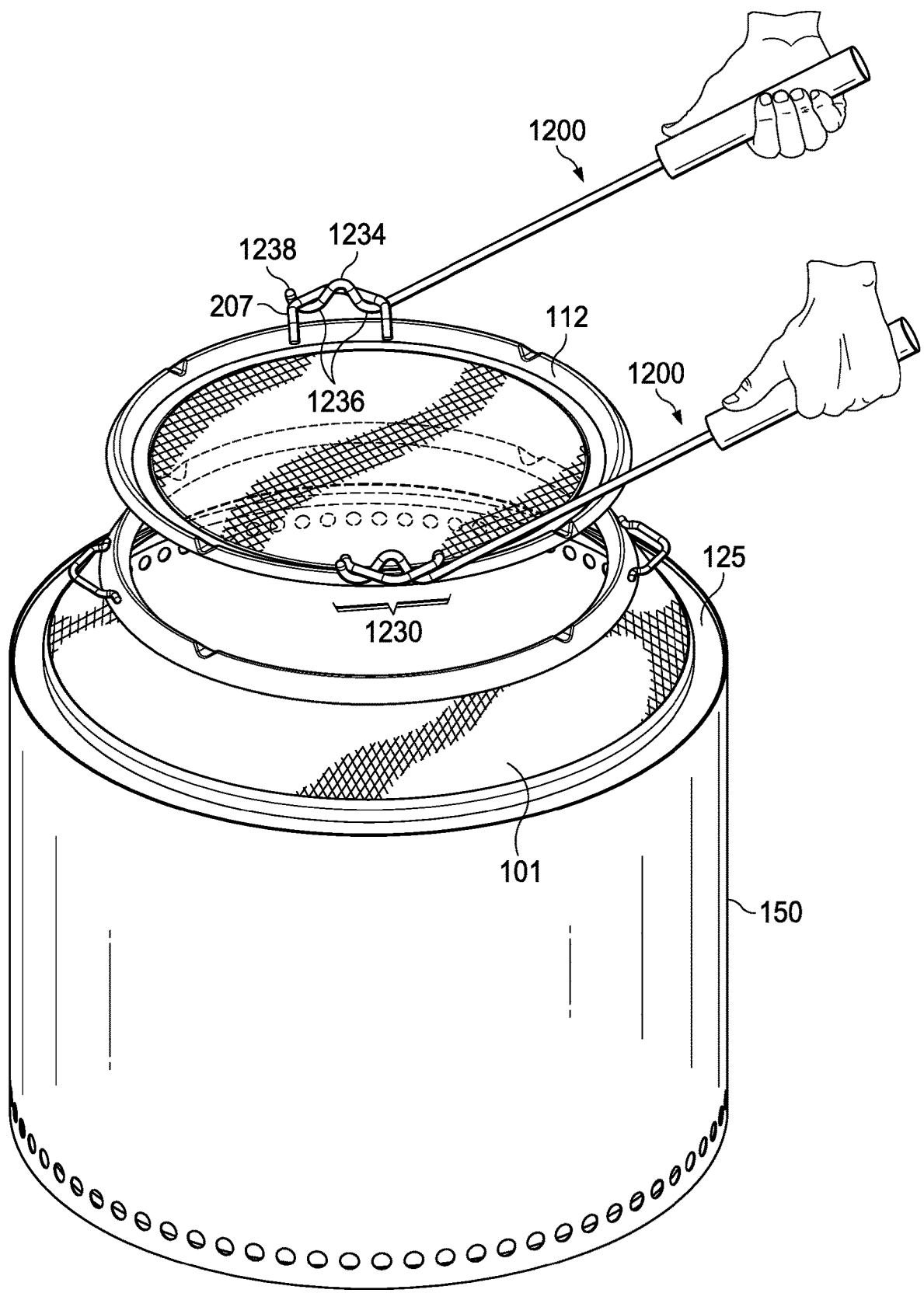
FIG. 14 is a perspective view of an example spark arrestor top assembly being lifted with a pair of example removal tools in accordance with at least one embodiment of the present disclosure.

FIG. 14 is a perspective view of an example spark arrestor top assembly 112 being lifted with a pair of example removal tools 112 in accordance with at least one embodiment of the present disclosure. The hooks 1230 of the removal tools 1200 engage with the handles 207 of the base assembly 101, such that the two lowered curves 1236 fit beneath the handle 207, while the raised curve 1234 and raised tip 1238 rise above the handle 207. As also shown in FIG. 13, this configuration provides stability which permits the carried assembly (i.e., the top assembly 112, base assembly 101, or spark arrestor 100) to be held in a stable, approximately level orientation and prevents the carried assembly from tipping, rocking, swinging, or falling.

Figure 15:
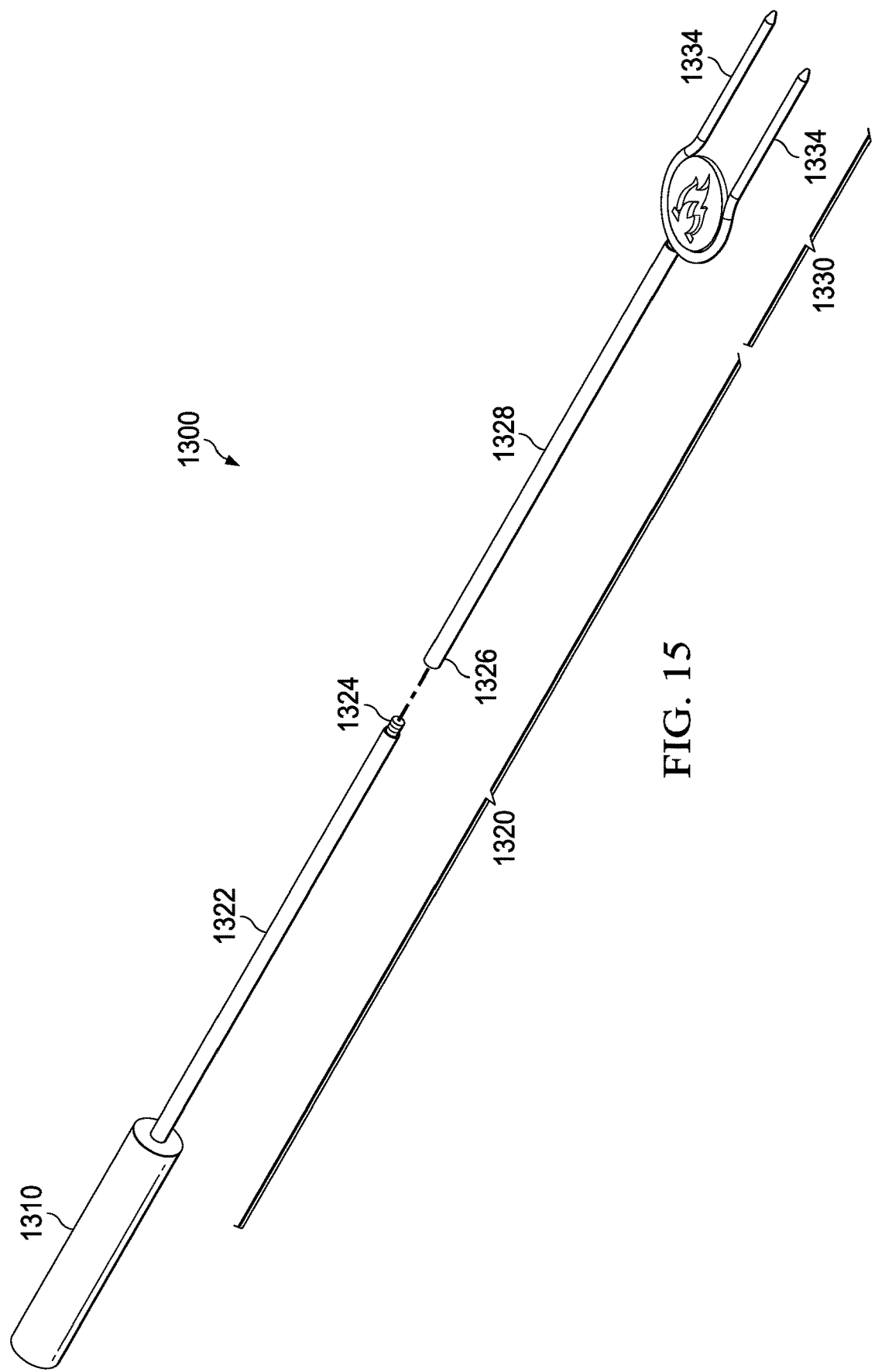
FIG. 15 is a view of an example roasting stick for a wood burning stove with spark arrestor in accordance with at least one embodiment of the present disclosure.

FIG. 15 is a view of an example roasting stick 1300 for a wood burning stove 150 with spark arrestor 100 in accordance with at least one embodiment of the present disclosure. The roasting stick 1300 includes a handle 1310, rod 1320, and tip 1330. The rod 1320 further comprises a proximal rod segment 1322, a threaded male end 1324, a threaded female receiver 1326, a distal rod segment 1328, and a tip 1330. The threaded male end 1324 of the proximal rod segment 1322 may be threaded into the threaded female receiver 1326 of the distal rod segment 1328 to form a continuous rod 1320. In some embodiments, the tip 1330 further comprises tines 1334, such that it may be used to roast hot dogs, marshmallows, and other foods. In other embodiments, the tip may comprise a tray, basket, rotisserie, or other fitting for holding food over the wood burning stove 150. In an example, the roasting stick 1300 is made of stainless steel to limit both heat conduction and corrosion. The handle 1310 may be of solid construction (e.g., a stainless steel bar), although a hollow handle 1310 may be lighter.

Figure 16:
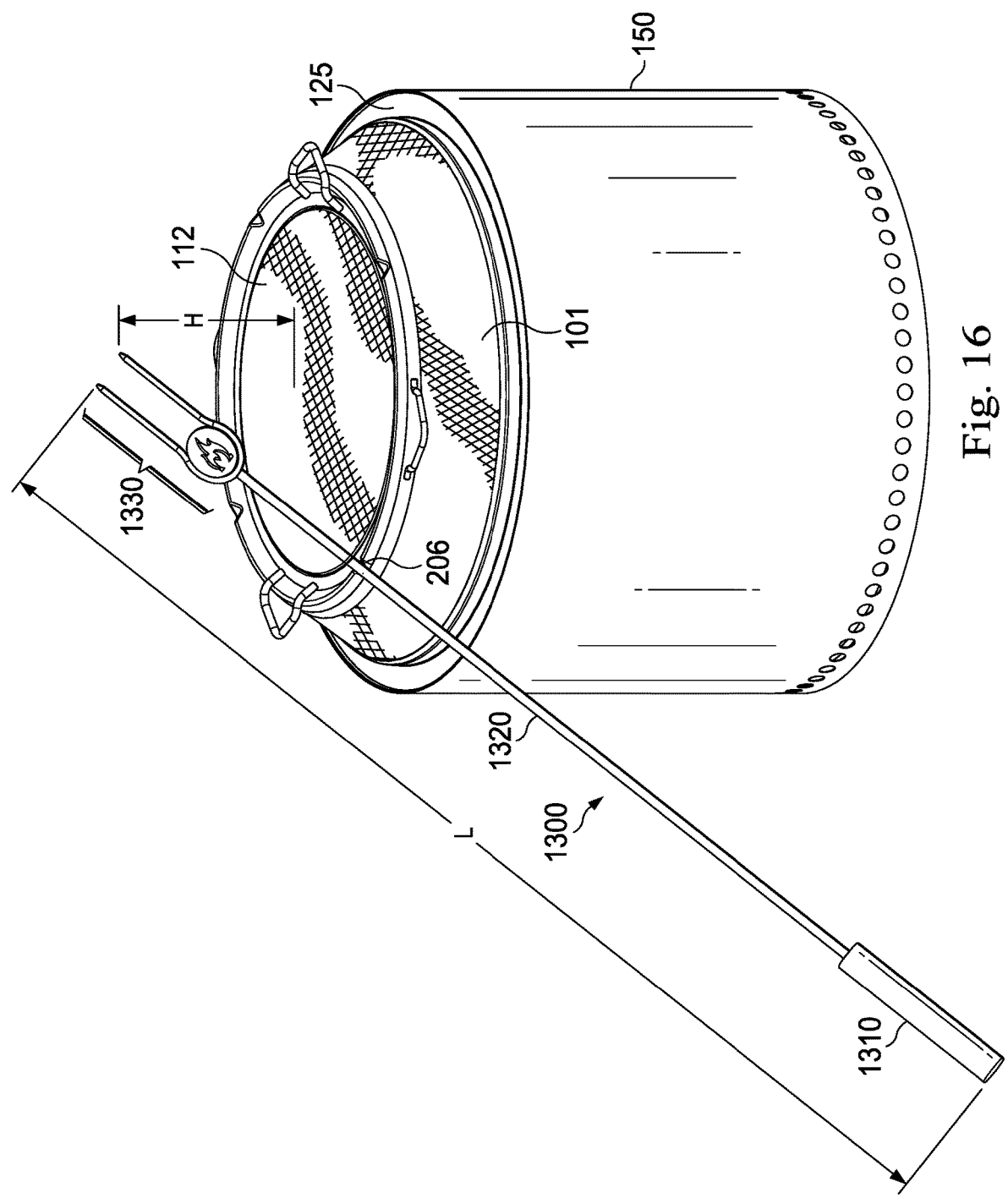
FIG. 16 is a perspective view of an example roasting stick resting in one of the rests of the top assembly of an example wood burning stove with spark arrestor, in accordance with at least one embodiment of the present disclosure.

FIG. 16 is a perspective view of an example roasting stick 1300 resting in one of the rests 206 of the top assembly 112 of an example wood burning stove 150 with spark arrestor 100, in accordance with at least one embodiment of the present disclosure. In this configuration, the handle of the roasting stick 1300 rests on the ground adjacent to the stove 150, while the rod 1320 of the roasting stick 1300 rests in the rest 206, and the tip 1330 of the roasting stick is suspended over the stove 150, such that it may be used to roast marshmallows, hot dogs, or other foods. This configuration is advantageous in that lateral motion of the roasting stick 1300 is mildly arrested by the rest 206, while longitudinal motion of the roasting stick 1300 is arrested by the ground. Thus, once placed in this configuration, the roasting stick 1300 may be used for hands-free roasting of hot dogs, marshmallows, and other foods.

The rest 206 may optionally include latching, locking, or friction components to further arrest motion of the roasting stick 1300, although this may not be advantageous, as a simple indentation 206 in the top crown 214 permits the roasting stick to be picked up, or rotated around its longitudinal axis, or repositioned longitudinally, with minimal effort. Longitudinal repositioning also has the effect of changing the height H of the roasting stick tip 1330 above the stove 150, thus changing the heating and cooking characteristics for any food affixed to the roasting stick tip 1330. In some embodiments, the length L of the roasting stick 1330 is selected such that while the roasting stick handle 1320 is resting on the ground and the roasting stick rod 1320 is resting in a rest 206, the roasting stick tip 1330 remains close to the centerline of the stove 150 (i.e., close to axis 270) regardless of the selected value for H. In an example, this length L is between 1.2 and 2.0 times the diameter of the stove, for stoves of diameter 49 cm or less, and between 1.8 and 2.5 times the diameter of the stove, for stoves of diameter greater than 49 cm. In an example, the value H+stove height is between 1.4 and 1.1 times the diameter of the stove, for stoves of diameter 49 cm or less, and between 0.7 and 1.2 times the diameter of the stove, for stoves of diameter greater than 49 cm.

When the top assembly 112 is removed from the stove 150 but the base assembly 101 remains in place, the roasting stick 1300 may alternatively be rested in one of the rests 206 of the base crown 205 rather than the rests 206 of the top crown 214.

Figure 17:
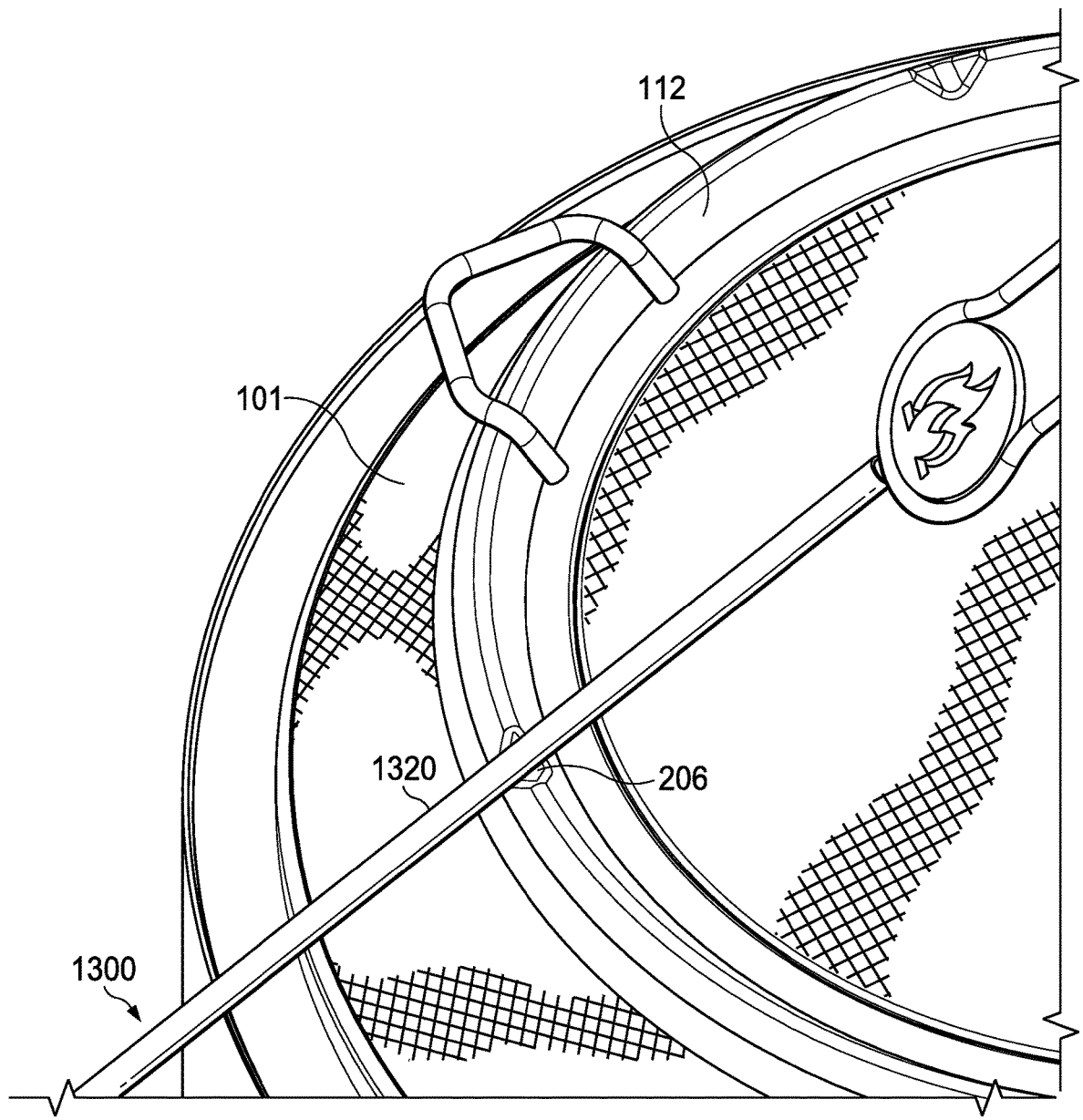
FIG. 17 is a closer perspective view of an example roasting stick resting in a roasting stick rest of the spark arrestor top assembly of an example wood burning stove with spark arrestor.

FIG. 17 is a closer perspective view of an example roasting stick 1300 resting in a roasting stick rest 206 of the spark arrestor top assembly 112 of an example wood burning stove 150 with spark arrestor 100. The rod 1320 of the roasting stick 1300 rests in the rest 206. In an example, the rest 206 may comprise a triangular, circular, elliptical, or other indentation sized and shaped to provide mild retention of the rod 1320 against accidental lateral motion, while providing little or no resistance against deliberate motion of the rod 1320 or roasting stick 1300. In this example, the roasting stick 1300 is resting in a rest 206 of the top assembly 112. However, roasting sticks 1300 may also be rested in the rests of the base assembly 101.

Figure 18:
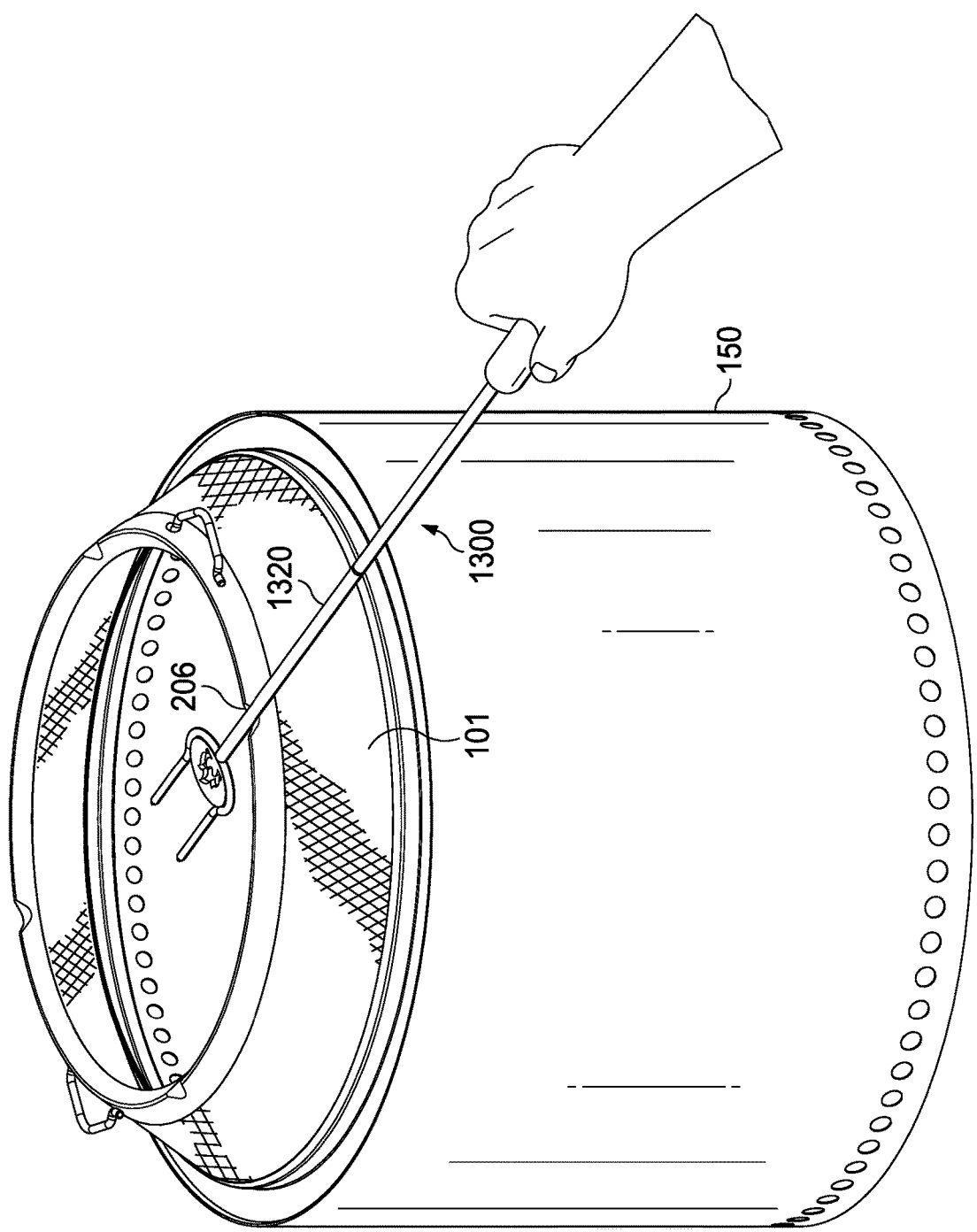
FIG. 18 is a perspective view of an example roasting stick resting in a roasting stick rest of the spark arrestor base assembly of an example wood burning stove with spark arrestor, while handheld by a user.

FIG. 18 is a perspective view of an example roasting stick 1300 resting in a roasting stick rest 206 of the spark arrestor base assembly 101 of an example wood burning stove 150 with spark arrestor 100, while handheld by a user. Once again, the rod 1320 of the roasting stick 1300 rests in the rest 206.

Accordingly, it can be seen that the spark arrestor 100 fills a long-standing need in the art, by providing a low-cost, lightweight, stampable, high-strength, high-stiffness, high-airflow two-piece structure that resists denting, warping, and other deformation while limiting the escape of sparks from the stove or firepit 150, at operating temperatures as high as about 1350° F. (732° C.), and while cycling repeatedly between ambient temperature and operating temperature.

A number of variations are possible on the examples and embodiments described hereinabove. For example, the spark arrestor 100 could be made of heavier-gauge material in order to support more weight, or of lighter gauge material in order to become lighter and more portable. The spark arrestor 100 could be made in different sizes and/or with different degrees of curvature. The relative lengths, widths, and radii of different components could be different than presented herein. Instead of being stamped to form, or stamped and then formed or folded, the various components of the spark arrestor 100 could be made by different processes, including casting, forging, sintering, milling, or 3D printing. The spark arrestor, or components thereof, could be made of different metals, or of nonmetallic materials such as ceramics or heat-resistant polymers. The shape of the spark arrestor 100 could be noncircular, including such possible shapes as ovals, rectangles, triangles, and rhombuses. The technology described herein may be used to burn firewood, wood chips or pellets, scrap lumber, paper, cardboard, coal, and other combustible materials. It may be employed for example in lamps, stoves, firepits, fireplaces, furnaces, forges, and boilers, and other combustion heaters. In some implementations, more than one spark arrestor 100 may be used, or the spark arrestor may comprise additional pieces that collectively form a structure like that described herein (e.g., a three-piece spark arrestor 100, wherein the top assembly 112 is replaced by a two-piece top assembly 112, or the base assembly 101 is replaced by a two-piece base assembly 101).

Either or both of the roasting sticks 1300 or removal tools 1200 may be used as fireplace pokers, or to place fuel 160 into the stove or firepit 150, or remove or rearrange fuel 160, or for other purposes related to tending a fire or preparing food therewith. Additional tools 1100 may be provided. In some embodiments, the spark arrestor 100 may be placed directly on the top section 152 of the stove or firepit 150 without the need for a connecting ring 125, or with the connecting ring 125 in an upside-down configuration.

The logical operations making up the embodiments of the technology described herein are referred to variously as operations, steps, objects, elements, components, or modules. Furthermore, it should be understood that these may be performed in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the spark arrestor. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the spark arrestor as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A spark arrestor assembly for a combustion fire pit, comprising:
 a first assembly comprising:
  a first ring defining a lower opening,
  a first crown defining an upper opening, and
  a conically shaped side screen extending between the first ring and the first crown; and
 a second assembly removably disposable on the first assembly and sized and shaped to cover the upper opening defined by the first crown of the first assembly, the second assembly comprising:
  a second ring forming a perimeter defining an area of the second assembly; and
  a top screen in the area defined by the perimeter,
 wherein the first assembly comprises a handle fixed to the first crown, the handle of the first assembly projecting radially outward, and
 wherein the second assembly comprises a handle fixed to the second ring, the handle of the second assembly projecting radially outward, further comprising a removal tool shaped to interface with any of the handles in at least two spaced locations to provide stability, wherein the removal tool comprises:
a rod having a distal end and proximal end; and
a hook disposed at the distal end of the rod, the hook comprising:
a raised curve;
two lowered curves; and
a raised tip.

2. A spark arrestor for a combustion fire pit having an opening to a combustion cavity for receipt of combustible fuel, comprising:
a conical frustum-shaped base assembly comprising a base ring, a base crown, a side screen, and at least one handle, the base ring having a width greater than a width of the opening to the combustion cavity, the base crown having width smaller than the width of the opening to the combustion cavity and introducible into the combustion cavity; and
a top assembly comprising a top screen and at least one handle and configured to removably rest on the base assembly, the top assembly having a width smaller than the width of the opening to the combustion cavity and introducible into the combustion cavity of the fire pit,
the base assembly being configured to removably rest on a top portion of the fire pit such that the base assembly is configured to block sparks or embers produced by the fire pit,
the top assembly being configured to removably rest on the base assembly such that the top assembly is configured to block sparks or embers produced by the fire pit.

3. The spark arrestor of claim 2, wherein the base ring, the base crown, and the top screen are circular and the side screen forms a truncated cone.

4. The spark arrestor of claim 2, further comprising at least one indented rest in the base crown and at least one rest in the top assembly, the at least one indented rest being configured to receive a roasting stick therein.

5. The spark arrestor of claim 2, wherein the at least one handle of the base assembly comprises two handles located about 180 degrees apart on the base assembly, and wherein the at least one handle of the top assembly comprises two handles located about 180 degrees apart on the top assembly, configured such that a pair of removal tools may hook into the handles and lift either or both of the top assembly or the base assembly in a level orientation.

6. The spark arrestor of claim 2, wherein the side screen and the top screen comprise a mesh including between 60% and 90% open space.

7. The spark arrestor of claim 2, wherein the base assembly is introducible into the combustion cavity of the fire pit in an inverted configuration.

8. The spark arrestor of claim 7, wherein when the base assembly is disposed in the combustion cavity of the fire pit in the inverted configuration, the base assembly is supported by the top portion of the fire pit.

9. The spark arrestor of claim 7, wherein, when the base assembly is disposed in the combustion cavity of the fire pit in the inverted configuration, the top assembly is introducible through the base ring and into the base assembly.

10. A spark arrestor assembly for a fire pit having an opening to a combustion cavity for receipt of combustible fuel, comprising:
a base assembly comprising:
a lower edge defining a lower opening sized to span the opening of the fire pit,
a first crown defining an upper opening, and
a conically shaped side screen extending between the lower opening and the first crown; and
a top assembly removably disposable on the base assembly and sized and shaped to cover the upper opening defined by the first crown of the base assembly, the top assembly comprising:
a top ring forming a perimeter; and
a top screen in an area defined by the perimeter,
wherein the base assembly comprises two handles extending outwardly on opposite sides of the base assembly, and
wherein the top assembly comprises two handles extending radially outwardly and fixed to the top ring.

11. The spark arrestor assembly of claim 10, wherein the top ring has substantially the same diameter as the first crown.

12. The spark arrestor assembly of claim 10, wherein the lower opening has an area greater than an area of the upper opening.

13. The spark arrestor assembly of claim 10, further comprising a removal tool shaped to interface with any of the handles in at least two spaced locations to provide stability.

14. The spark arrestor assembly of claim 10, wherein the lower edge, the first crown, and the top ring are circular.

15. The spark arrestor of claim 7, wherein the entire base crown and side screen of the base assembly is introducible into the combustion cavity of the fire pit in an inverted configuration.

* * * * *